US011881045B2

(12) United States Patent
Kim (10) Patent No.: US 11,881,045 B2
(45) Date of Patent: Jan. 23, 2024

(54) REGION EXTRACTION DEVICE, REGION EXTRACTION METHOD, AND REGION EXTRACTION PROGRAM

(71) Applicant: Rakuten Group, Inc., Tokyo (JP)

(72) Inventor: Mijung Kim, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 400 days.

(21) Appl. No.: 17/311,409

(22) PCT Filed: Jul. 7, 2020

(86) PCT No.: PCT/JP2020/026550
§ 371 (c)(1),
(2) Date: Jun. 7, 2021

(87) PCT Pub. No.: WO2022/009305
PCT Pub. Date: Jan. 13, 2022

(65) Prior Publication Data
US 2022/0189194 A1    Jun. 16, 2022

(51) Int. Cl.
*G06V 40/10* (2022.01)
*G06V 10/25* (2022.01)
*G06V 20/52* (2022.01)
*G06T 7/20* (2017.01)

(52) U.S. Cl.
CPC .............. *G06V 40/107* (2022.01); *G06T 7/20* (2013.01); *G06V 10/25* (2022.01); *G06V 20/52* (2022.01)

(58) Field of Classification Search
CPC ...... G06V 40/107; G06V 10/25; G06V 20/52; G06V 10/62; G06V 40/113; G06V 40/20; G06T 7/20; G06T 7/70
See application file for complete search history.

(56) References Cited

U.S. PATENT DOCUMENTS 6,819,782 B1 * 11/2004 Imagawa .................. G06T 7/74
382/218
2021/0142490 A1 * 5/2021 Shiraishi .............. G06V 40/107

FOREIGN PATENT DOCUMENTS

JP    2016-201105 A    12/2016
JP    2017033144 A *   2/2017
JP    2019133232 A *   8/2019    ........... G07G 1/0081
(Continued)

OTHER PUBLICATIONS

Zhu et al., "Multimodal biometric identification system based on finger geometry, knuckle print and palm print" (Year: 2010).*
(Continued)

*Primary Examiner* — Dung Hong
(74) *Attorney, Agent, or Firm* — Sughrue Mion, PLLC (57) ABSTRACT

A region extraction device acquires a first frame image and a second frame image which are temporally successive. The device acquires, based on the acquired first frame image and second frame image, motion information indicating a region where a motion exists in the first frame image, detects, based on the acquired first frame image, positions of an elbow and a wrist of a human body from the region where the motion exists indicated by the acquired motion information, and extracts, based on the detected positions, a region corresponding to a part, of the region where the motion exists indicated by the acquired motion information, located in a human body hand's side of the wrist.

11 Claims, 8 Drawing Sheets

(56) References Cited

FOREIGN PATENT DOCUMENTS

WO        WO-2018042751 A1 *    3/2018    ............... G06F 3/01

OTHER PUBLICATIONS

Stergiopoulou et al., "Hand gesture recognition using a neural network shape fitting technique" (Year: 2009).*
Zhou et al., "A novel finger and hand pose estimation technique for real-time hand gesture recognition" (Year: 2015).*
International Search Report for PCT/JP2020/026550 dated Sep. 24, 2020 [PCT/ISA/210].
Xiaochen Liu et al., "Grab:Fast and Accurate Sensor Processing for Cashier-Free Shopping", XP081572231, 2020, pp. 1-15 (15 pages total).
Tatsuhiro Tsukamoto et al., "A Method for Detecting Human-object Interaction based on Motion Distribution around Hand", XP055854509, 2020 (8 pages total).
Henning Hamer et al., "Tracking a Hand Manipulating an Object", 2009 IEEE 12th International Conference on Computer Vision (ICCV), XP031672612, 2009, pp. 1475-1482 (8 pages total).

* cited by examiner

REGION EXTRACTION DEVICE, REGION EXTRACTION METHOD, AND REGION EXTRACTION PROGRAM

CROSS REFERENCE TO RELATED APPLICATIONS

This application is a National Stage of International Application No. PCT/JP2020/026550 filed Jul. 7, 2020.

TECHNICAL FIELD

The present invention relates to a method for extracting a region in which a thing is shown from an image.

BACKGROUND ART

Conventionally, a technique of identifying an item for sale picked up by a person from a place where items for sale are placed using an image recognition technique is known. For example, Patent Literature 1 discloses a marketing information collecting device that infers what an item for sale picked up by a customer from a store shelf is. This information collecting device slides a region with respect to an image captured from the ceiling existing above a space between the store shelf and the customer, and calculates a similarity between a feature amount of each region and a feature amount of each item for sale calculated in advance. The information collecting device infers that an item for sale having a maximum similarity exceeding a threshold is an item for sale included in a corresponding region.

CITATION LIST

Non Patent Literature

Patent Literature 1: JP 2016-201105 A

SUMMARY OF INVENTION

Technical Problem

However, when an image is captured from above, a target object may be hidden and cannot be recognized in some cases. Meanwhile, when an image is captured from a store shelf or the vicinity of an outlet of an item for sale to the outside, various objects including objects other than the target object will be captured, and therefore an object other than the target object may be recognized.

The present invention has been achieved in view of the above points, and an example of objects of the present invention is to provide a region extraction device, a region extraction method, and a region extraction program, which can extract a region in which a target object is shown from an image more accurately.

Solution to Problem

In order to solve the above problem, an aspect of the present invention is a region extraction device comprising: a frame image acquisition means that acquires a first frame image and a second frame image which are temporally successive; a motion information acquisition means that acquires, based on the acquired first frame image and second frame image, motion information indicating a region where a motion exists in the first frame image; a detection means that detects, based on the acquired first frame image, positions of an elbow and a wrist of a human body from the region where the motion exists indicated by the acquired motion information; and an extraction means that extracts, based on the detected positions, a region corresponding to a part, of the region where the motion exists indicated by the acquired motion information, located in a human body hand's side of the wrist.

According to this aspect, motion information indicating a region where a motion exists in a first frame image is acquired. When an object to be recognized is held by a hand of a human body, the object, the hand, and an arm may be moving in the images. Then, the positions of an elbow and a wrist of the human body are detected from the region where the motion exists. Then, a region corresponding to a part, of the region where the motion exists, located in a human body hand's side of the wrist is extracted. When the region where the motion exists is divided into two parts with the wrist as a boundary, of these parts, a part where the elbow is not located is the part located in the hand's side. The object held by the hand overlaps with the hand in the image. Therefore, by extracting the region corresponding to the part located in the hand's side, the region in which the target object is shown can be extracted more accurately.

Another aspect of the present invention is the region extraction device, wherein the extraction means controls the extraction of the region corresponding to the part located in the hand's side based on a result of comparison between a color of the part located in the hand's side and a predetermined skin color.

When the object is held by the hand, the part located in the hand's side in the region where the motion exists includes pixels having the color of the object. Therefore, a color other than a skin color may be extracted from the part located in the hand's side. According to this aspect, it is possible to estimate whether or not the hand is holding the object by comparing the color of the part located in the hand's side with a predetermined skin color. As a result, extraction of the region is controlled, and therefore it is possible to suppress extraction of a region in which the target object is not shown.

Yet another aspect of the present invention is the region extraction device, wherein the extraction means extracts the region corresponding to the part located in the hand's side when a difference between the color of the part located in the hand's side and the skin color exceeds a predetermined degree.

According to this aspect, when a difference between the color of the part located in the hand's side and the predetermined skin color exceeds a predetermined degree, the region is extracted, and therefore it is possible to suppress extraction of a region in which the object is not shown.

Yet another aspect of the present invention is the region extraction device, wherein the detection means further detects positions of a finger joint and a fingertip of the human body from the region where the motion exists, and the extraction means modifies the region to be extracted based on the positions of the finger joint and the fingertip.

According to this aspect, the position of the object held by the hand can be estimated based on detected positions of a finger joint and a fingertip, and therefore the region in which the target object is shown can be set more appropriately.

Yet another aspect of the present invention is the region extraction device, wherein the extraction means expands the region to be extracted according to a direction from the finger joint to the fingertip.

The object held by the hand tends to protrude from the hand in the direction of the fingertip. According to this aspect, the region can be expanded in the direction of the fingertip, and therefore the region in which the target object is shown can be set more appropriately.

Yet another aspect of the present invention is the region extraction device, wherein the detection means detects the positions of the elbow and the wrist using a predetermined posture estimation model.

Yet another aspect of the present invention is the region extraction device, further comprising a training means that trains, using an image in the extracted region, a model for identifying an object in an image.

According to this aspect, a model is trained with an image in a region corresponding to the part located in the hand's side in the region where the motion exists. Therefore, since, in the first frame image, the image in the part in which the object held by the hand is shown is used for training, the model can be trained so as to identify the target object more appropriately.

Yet another aspect of the present invention is the region extraction device, further comprising an output means that outputs object information indicating an object existing in the extracted region by inputting an image in the extracted region into a predetermined model.

According to this aspect, information indicating the object held by the hand is output from the image in the region corresponding to the part located in the hand's side in the region where the motion exists. Therefore, since identification of an object not held by the hand is prevented, a target object that should be originally identified can be identified.

Yet another aspect of the present invention is the region extraction device, wherein the acquired motion information is a dense optical flow.

Yet another aspect of the present invention is a region extraction method performed by a computer, the method comprising: a frame image acquisition step of acquiring a first frame image and a second frame image which are temporally successive; a motion information acquisition step of acquiring, based on the acquired first frame image and second frame image, motion information indicating a region where a motion exists in the first frame image; a detection step of detecting, based on the acquired first frame image, positions of an elbow and a wrist of a human body from the region where the motion exists indicated by the acquired motion information; and an extraction step of extracting, based on the detected positions, a region corresponding to a part, of the region where the motion exists indicated by the acquired motion information, located in a human body hand's side of the wrist.

Yet another aspect of the present invention is a region extraction program causing a computer to function as: a frame image acquisition means that acquires a first frame image and a second frame image which are temporally successive; a motion information acquisition means that acquires, based on the acquired first frame image and second frame image, motion information indicating a region where a motion exists in the first frame image; a detection means that detects, based on the acquired first frame image, positions of an elbow and a wrist of a human body from the region where the motion exists indicated by the acquired motion information; and an extraction means that extracts, based on the detected positions, a region corresponding to a part, of the region where the motion exists indicated by the acquired motion information, located in a human body hand's side of the wrist.

Advantageous Effects of Invention

According to the present invention, it is possible to extract a region in which a target object is shown from an image more accurately.

DESCRIPTION OF EMBODIMENTS

Hereinafter, an embodiment of the present invention will be described in detail with reference to the drawings. In the embodiment described below, the present invention is applied to an image processing device that executes learning for generating a model that identifies an object in an image and identifies the object using the generated model. Identification of the object may include recognizing or classifying an object existing in an image. Note that a device that executes learning and a device that identifies an object may be separate devices.

[1. Configuration of Image Processing Device]

Figure 1:
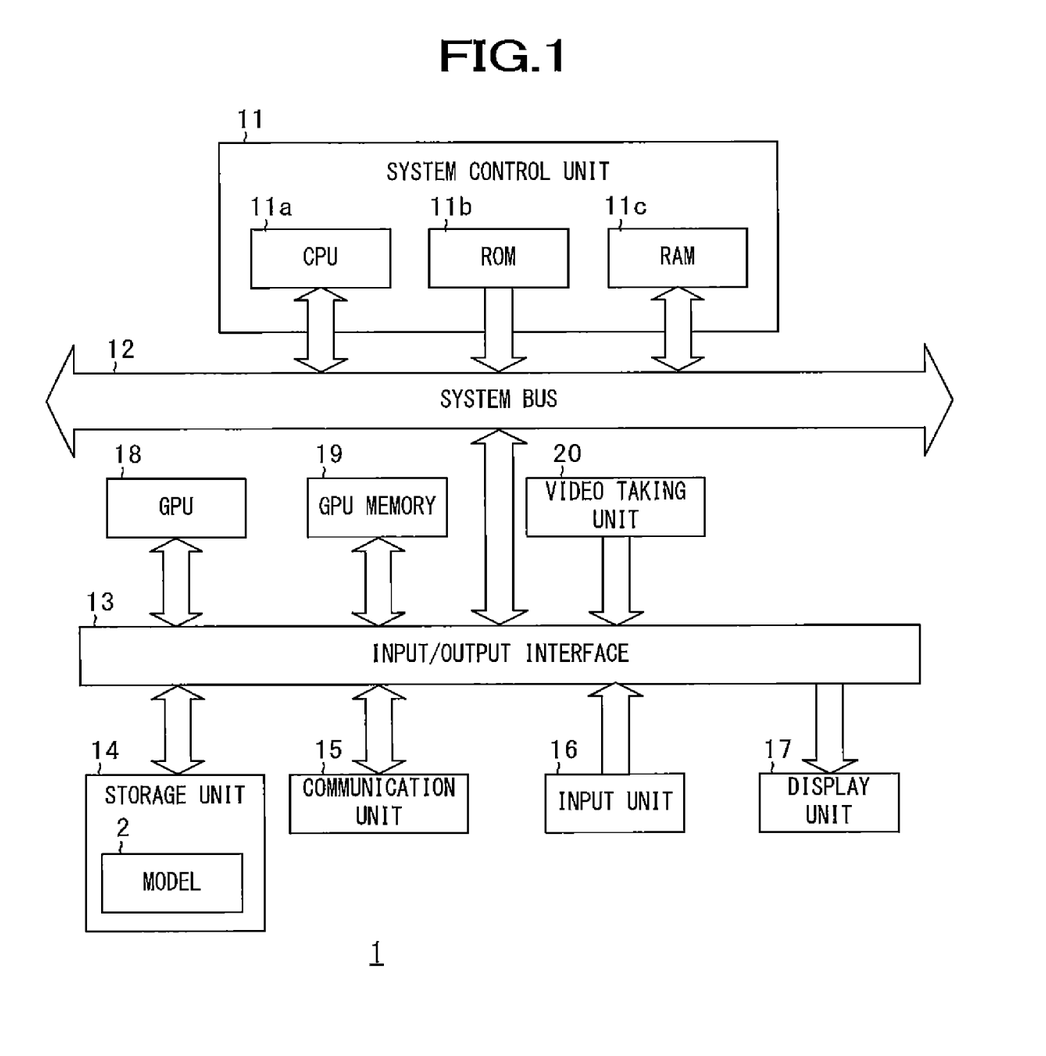
FIG. 1 is a block diagram illustrating an example of an outline configuration of an image processing device 1 according to an embodiment.

First, a configuration of an image processing device 1 will be described by using FIG. 1. FIG. 1 is a block diagram illustrating an example of an overview configuration of the image processing device 1 according to the present embodiment. As illustrated in FIG. 1, the image processing device 1 includes a system control unit 11, a system bus 12, an input/output interface 13, a storage unit 14, a communication unit 15, an input unit 16, a display unit 17, a graphics processing unit (GPU) 18, a GPU memory 19 (or a video RAM), and a video taking unit 20. The system control unit 11 and the input/output interface 13 are connected to each other via the system bus 12. Examples of the image processing device 1 include a server device, a personal computer, and the like.

The system control unit 11 includes a central processing unit (CPU) 11a, a read only memory (ROM) 11b, a random access memory (RAM) 11c, or the like.

The input/output interface 13 performs interface processing between the system control unit 11 and, the storage unit 14, the communication unit 15, the input unit 16, the display unit 17, the GPU 18, the GPU memory 19 and the video taking unit 20.

The storage unit 14 includes, for example, a hard disk drive, a solid state drive, or the like. The storage unit 14 stores a model 2 that was generated, training data used for generating the model 2, and the like. The training data includes video data and a label (Ground Truth) of a class of an object present in a video indicated by the video data. Examples of video data formats include H.264, MPEG-2, and the like. The storage unit 14 further stores an operating system, a program for model generation, a program for object identification, and the like. The training data and various programs may be, for example, acquired from a predetermined computer via a network, or may be recorded on a recording medium such as an optical disk, a memory card, or a magnetic tape and read via a drive device. In a case where a device that generates the model 2 and a device that performs object identification are separate devices, the generated model 2 may be transferred via a network or via a recording medium.

The communication unit 15 includes, for example, a network interface controller, or the like. The communication unit 15 is connected to other computers via a predetermined network such as the Internet or a local area network (LAN), and controls a state of communication with the computers.

The input unit 16 receives operation by an operator and outputs a signal corresponding to content of the operation to the system control unit 11. Examples of the input unit 16 include a keyboard, a mouse, a touch panel, and the like.

The display unit 17 includes, for example, a graphic controller, a display, and the like. The display unit 17 displays information such as images and text under control of the system control unit 11. Examples of panels for display include a liquid crystal panel, an organic light emitting (EL) panel, and the like.

The GPU 18 executes matrix operation, or the like, in machine learning under control of the system control unit 11. The GPU 18 performs pipeline processing of a plurality of calculations in parallel. The GPU 18 and the GPU memory 19 are connected. The GPU memory 19 stores data used for calculation by the GPU 18 and results of the calculation. Note that, in a case where the system control unit 11 executes all calculations in machine learning, the GPU 18 and the GPU memory 19 are unnecessary.

The video taking unit 20 includes, for example, a digital camera including a charge-coupled device (CCD) sensor, a complementary metal oxide semiconductor (CMOS) sensor, and the like. The video taking unit 20 takes a video based on control by the system control unit 11. The video taking unit 20 outputs video data indicating the taken video to the system control unit 11 or the storage unit 14. The device that executes learning is not required to include video taking unit 20 in a case where a device that executes learning and a device that performs object identification are separate devices. Furthermore, the image processing device 1 is not required to include the video taking unit 20 in a case where object identification is executed from video data acquired from another computer or recording medium instead of being executed in real time from a video taken by the video taking unit 20.

The image processing device 1 itself is not required to include at least one of the input unit 16, the display unit 17, the GPU 18, the GPU memory 19, and the video taking unit 20. At least one of these may be connected to the image processing device 1 by wire or wirelessly.

[2. Functional Outline of System Control Unit]

Figure 2:
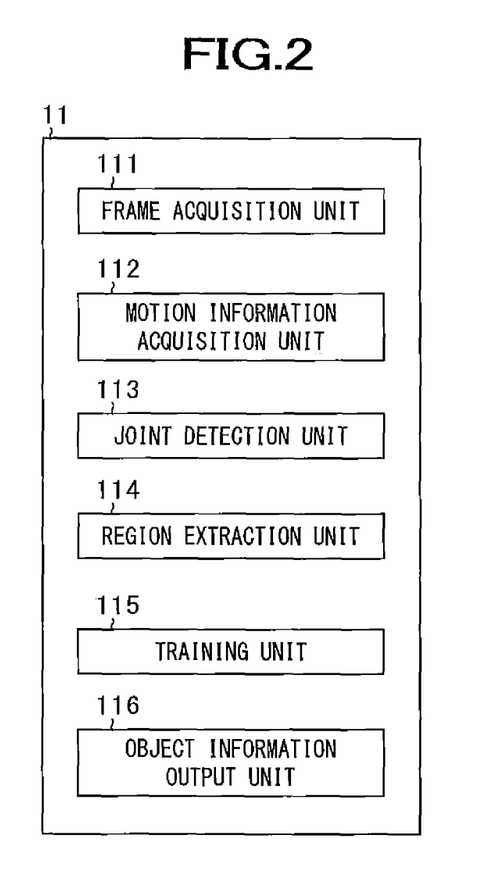
FIG. 2 is a diagram illustrating an example of functional blocks of a system control unit 11 and a GPU 18 of the image processing device 1 according to the embodiment.

Next, a functional outline of the system control unit 11 and the GPU 18 will be described with reference to FIGS. 2 to 6. FIG. 2 is a diagram illustrating an example of functional blocks of the system control unit 11 and the GPU 18 of the image processing device 1 according to the present embodiment. The CPU 11a reads and executes various codes and the like included in a program stored in the storage unit 14, and as illustrated in FIG. 2, the system control unit 11 and the GPU 18 thereby function as a frame acquisition unit 111, a motion information acquisition unit 112, a joint detection unit 113, a region extraction unit 114, a training unit 115, an object information output unit 116, and the like.

Figure 3:
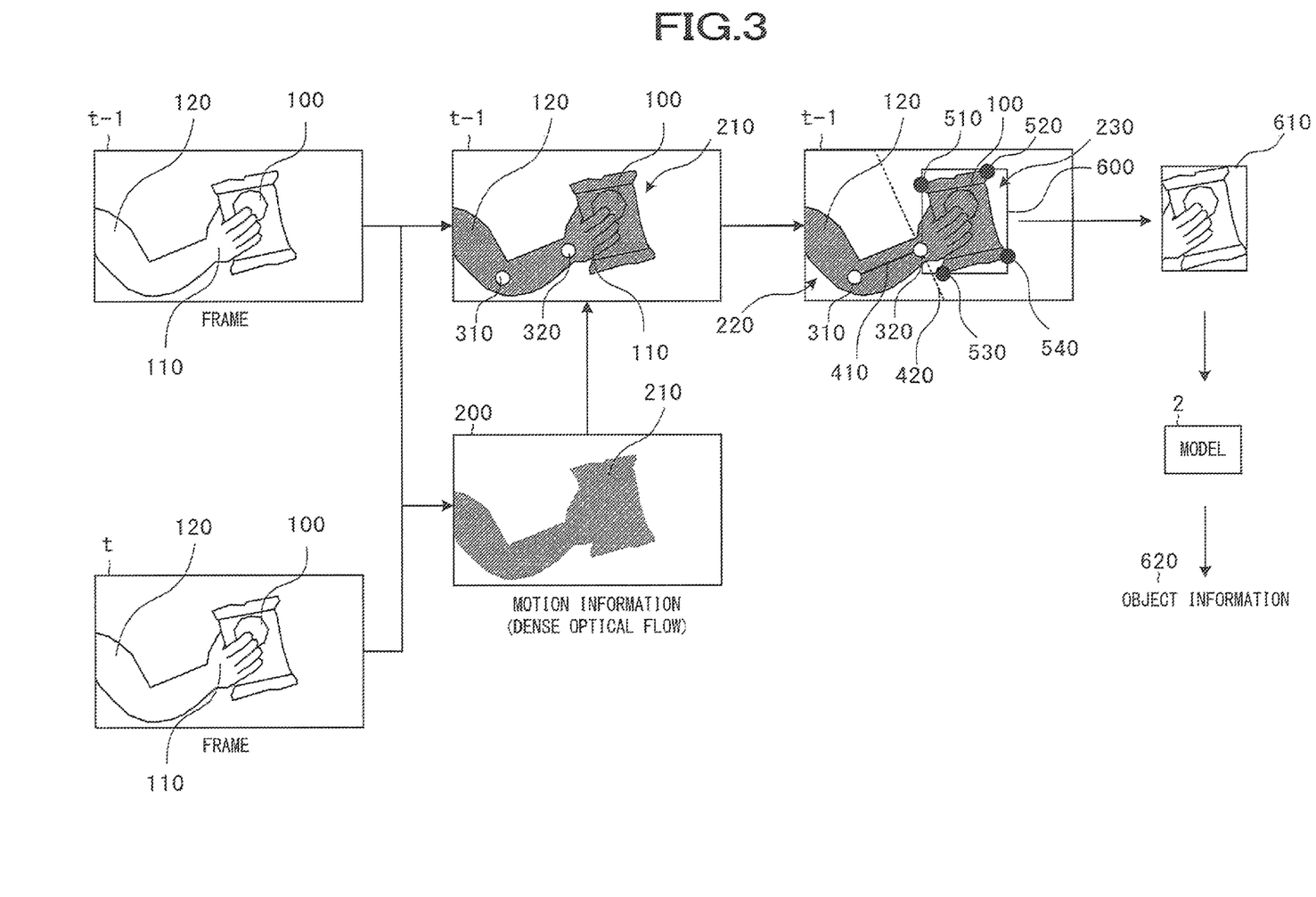
FIG. 3 is a diagram illustrating an example of a flow of processes performed by the image processing device 1.

FIG. 3 is a diagram illustrating an example of a flow of processes performed by the image processing device 1. The frame acquisition unit 111 acquires temporally successive frame images. The frame images are still images included in a video. The video from which the frame images are acquired is usually a video taken by the video taking unit 20. However, when the model 2 is trained as described later, the video from which the frame images are acquired may be stored in advance in, for example, the storage unit 14. It is assumed that an object 100 that should be identified is shown in the video. The object 100 to be identified may be something different from a part of a human body. Examples of the object 100 include groceries, beverages, stationery, daily necessities, miscellaneous goods, and the like. In addition, it is assumed that the object 100 to be identified is held by a hand 110 of a human body. Usually, it is assumed that the video is taken when the hand 110 and an arm 120 holding the object 100 are moving. For example, the video may be taken when someone takes out the object 100 from a certain location or attempts to return the object 100 to its original location. Therefore, it is assumed that the object 100 and the hand 110 and the arm 120 holding the object 100 are moving in the video. Of the frame images included in the video, at least one frame image does not have to include the object 100. That is, the object 100 may move into or move out of a frame. In addition, the object 100 does not have to move at all between some frame images. The video to be taken includes temporally successive frames. The temporally successive frames are, for example, frames having successive times of taking them. For example, when a frame rate is 30 fps, frames are taken at ⅓₀ second intervals. The frame acquisition unit 111 may sequentially acquire frame images from video data according to an order of taking them. In FIG. 3, the frame acquisition unit 111 acquires, for example, a frame t−1 and a frame t. The frame t−1 is a t−1th frame image according to the taking order among the frame images included in the video. The frame t is a t-th frame image. Therefore, the frame t−1 and the frame t are temporally successive.

The motion information acquisition unit 112 acquires motion information 200 indicating a region 210 where a motion exists in the frame t−1 based on the frame t−1 and the frame t acquired by the frame acquisition unit 111. The motion region 210 may be a region where a visual change occurs when the frame changes from the frame t−1 to the frame t. The motion region 210 may be a region occupied by something that is moving in the frame t−1 when the frame changes. Something that is moving may be, for example, the object 100, the hand 110, the arm 120, another item, and/or the like. From the above assumptions, the motion region 210 is usually considered to include at least a region occupied by the object 100, the hand 110, and the arm 120. The motion information 200 may include coordinates of the motion region 210. Alternatively, the motion information 200 may include information indicating whether or not there is motion for each pixel of the frame t−1. Alternatively, the motion information 200 may include a vector indicating a moving direction and a moving distance for each pixel of the frame t−1. The motion information 200 may be, for example, an optical flow. Examples of the optical flow include a dense optical flow. The dense optical flow indicates a motion region. The motion information 200 may be the dense optical flow. The optical flow may be generated using a model including a convolutional neural network (CNN). Examples of such a model include FlowNet, FlowNet 2.0, LiteFlowNet, and the like. A model trained in advance may be used. As a method for generating the optical flow, a method not using machine learning may be used. Examples of such a method include a block matching method, a gradient method, and the like. The motion information 200 may be information different from the optical flow. For example, the motion information 200 may be generated using an interframe subtraction method or a background subtraction method.

The joint detection unit 113 detects, based on the frame t−1 acquired by the frame acquisition unit 111, positions of joints of the human body from the region 210 where the motion exists indicated by the motion information 200 acquired by the motion information acquisition unit 112. In particular, the joint detection unit 113 detects positions of an elbow 310 and a wrist 320 of the human body. The joint detection unit 113 may use a posture estimation model of a human body to detect the positions of the elbow 310 and the wrist 320. This model may include, for example, a CNN. Examples of the posture estimation model include Deep-Pose, Convolutional Pose Machines, HRNet, and the like. The joint detection unit 113 may detect the positions of fingertip(s) and finger joint(s) of the human body from the motion region 210 in addition to the positions of the elbow 310 and the wrist 320. That is, the joint detection unit 113 may detect the positions of the fingertip(s) and the finger joint(s) constituting the hand 110. finger(s) for which the fingertip(s) and the joint(s) are to be detected may be at least one of a thumb, an index finger, a middle finger, a ring finger, and a little finger. The joint(s) to be detected may be at least one of first, second, and third joints.

The region extraction unit 114 extracts, based on the positions of the elbow 310 and the wrist 320 detected by the joint detection unit 113, a region 600 corresponding to a part, of the region 210 where the motion exists indicated by the motion information 200 acquired by the motion information acquisition unit 112, located in a human body hand 110's side of the wrist 320. Usually, the hand 110 and the arm 120 can be divided into the hand 110 and the arm 120 with the wrist 320 as the center. For example, the region extraction unit 114 may calculate a straight line 410 connecting the elbow 310 and the wrist 320 in the frame t−1 based on the detected positions. The region extraction unit 114 may calculate a straight line 420 intersecting with the straight line 410 at a right angle at the position of the wrist 320. In the motion region 210, a part where the elbow 310 is located is a part 220 located in an arm 120's side when assuming that the straight line 420 is a boundary. In addition, in the motion region 210, a part where the elbow 310 is not located is a part 230 located in the hand 110's side.

When identifying the part 230 located in the hand 110's side, the region extraction unit 114 may set the region 600 having a predetermined shape corresponding to the hand 110's side 230. The region 600 may be a region surrounding the hand 110's side 230. As a result, when the hand 110 is holding the object 100, the region extraction unit 114 extracts a region surrounding the object 100 as the region 600. The region 600 may be, for example, a bounding box. The shape of the region 600 may be, for example, a rectangle or another shape. The region extraction unit 114 may identify, for example, the coordinates of each vertex having an internal angle of less than 180 degrees in the region of the part 230 located in the hand 110's side. The number of vertices to be specified may be four, three, or five or more. In FIG. 3, vertices 510, 520, 530, and 540 are specified. The region extraction unit 114 may identify the minimum and maximum X coordinates among the X coordinates of all vertices, and may identify the minimum and maximum Y coordinates among the Y coordinates of all vertices. Then, the region extraction unit 114 may determine the coordinates of the region 600 based on the identified X coordinate and Y coordinate. For example, a combination of the minimum X and Y coordinates serves as the coordinates of the upper left vertex of the region 600, and a combination of the maximum X and Y coordinates serves as the coordinates of the lower right vertex of the region 600. The region extraction unit 114 extracts the set region 600 in the frame t−1 and acquires an image 610 corresponding to the region 600.

Figure 4:
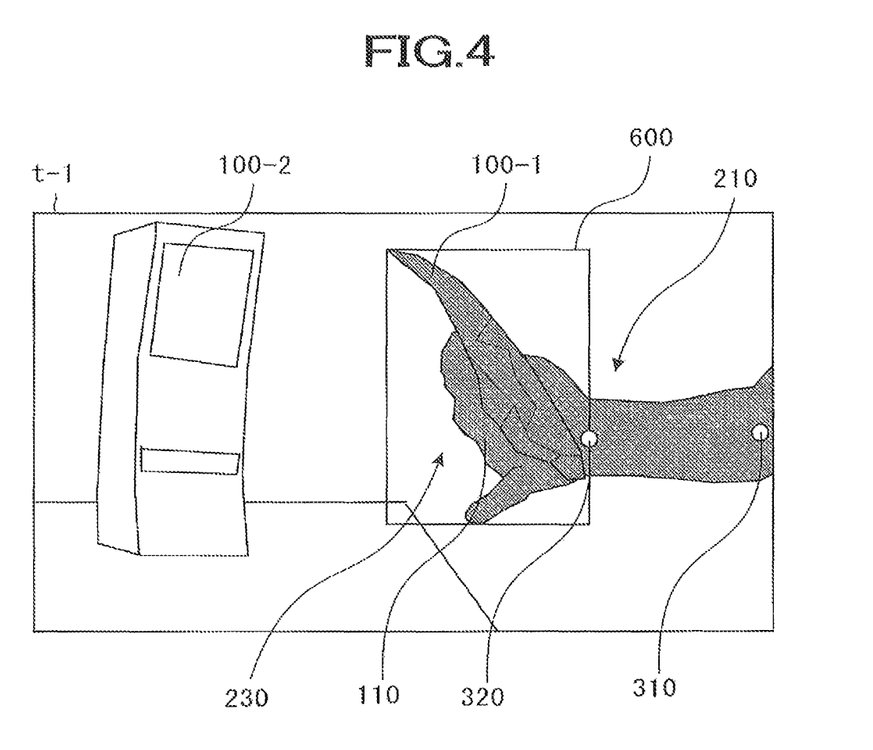
FIG. 4 is a diagram illustrating an example of an effect of operation by the image processing device 1.

FIG. 4 is a diagram illustrating an example of an effect of operation of the image processing device 1. Objects 100-1 and 100-2 are in the frame t−1 illustrated in FIG. 4. The object 100-1 is held by the hand 110. The object 100-2 is placed on a table. It is assumed that the image processing device 1 can identify both the objects 100-1 and 100-2. However, an object to be identified is the object 100-1. Since the hand 110 and the arm 120 holding the object 100-1 are moving, the object 100-1 is also moving in the video. Meanwhile, the object 100-2 does not move. Therefore, the motion information acquisition unit 112 acquires the motion information 200 indicating a region occupied by the object 100-1, the hand 110, and the arm 120 as the motion region 210. A region occupied by the object 100-2 is excluded from this motion region 210. Therefore, the region where the object 100-2 that should not be identified is shown is prevented from being extracted. In addition, the joint detection unit 113 detects the positions of the elbow 310 and the wrist 320. The region extraction unit 114 can identify in which the hand 110 is shown from the motion region 210 based on the positions of the elbow 310 and the wrist 320. Since the object is assumed to be held by the hand 110, by identifying the part 230 located in the hand 110's side, the region in which the target object to be identified is shown can be extracted more accurately.

The region extraction unit 114 may control extraction of the region 600 corresponding to the part 230 located in the hand 110's side based on a result of comparison between the color of the part 230 located in the hand 110's side and a predetermined skin color in the region 210 where the motion exists. This control may be to control whether or not to extract the image 610 corresponding to the region 600. The region extraction unit 114 estimates whether or not the hand 110 is holding the object based on the color comparison. The region extraction unit 114 may extract the region 600 only when the hand 110 is estimated to be holding the object.

The color of the part 230 located in the hand 110's side may be, for example, an average color of the part 230. For example, the region extraction unit 114 may calculate an average of pixel values in the part 230. The predetermined skin color may be, for example, the color of a hand of a human body. For example, an administrator of the image processing device 1 may input brightness values of R, G, and B for the skin color to the image processing device 1 in advance. Alternatively, the image processing device 1 or another device may calculate an average color of the hand color from one or more images in which the hand is shown. The calculated numerical value of the average color may be stored in advance in the storage unit 14 as a numerical value of the predetermined skin color.

The region extraction unit 114 may extract the region 600, for example, when a difference between the color of the part 230 located in the hand 110's side and the predetermined skin color exceeds a predetermined degree. The region extraction unit 114 may calculate the difference in color using a known algorithm. For example, the region extraction unit 114 may calculate a Euclidean distance. Alternatively, the region extraction unit 114 may calculate a difference in brightness value for each of R, G, and B, and may sum up the calculated differences in brightness value. The region extraction unit 114 may extract the region 600 only when the numerical value of the difference in color exceeds a predetermined threshold. When the hand 110 is holding something, the part 230 located in the hand 110's side is likely to include a relatively large number of pixels having colors other than the skin color. In this case, the average color of the part 230 located in the hand 110's side is significantly different from the skin color. This makes it possible to estimate whether or not the hand 110 is holding the object 100.

Figure 5A:
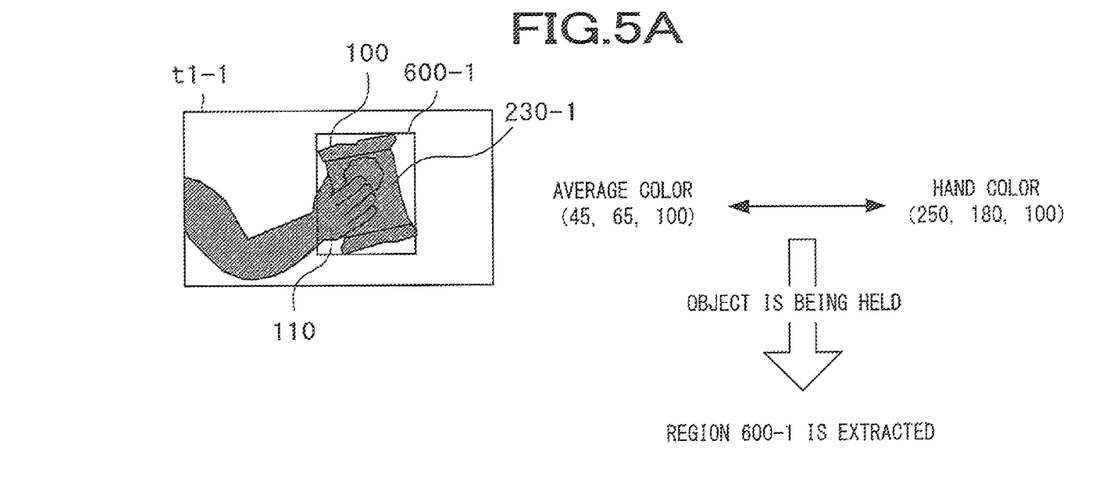
FIGS. 5A and 5B are diagrams illustrating examples of extracting a region on a hand 110's side.
Figure 5B:
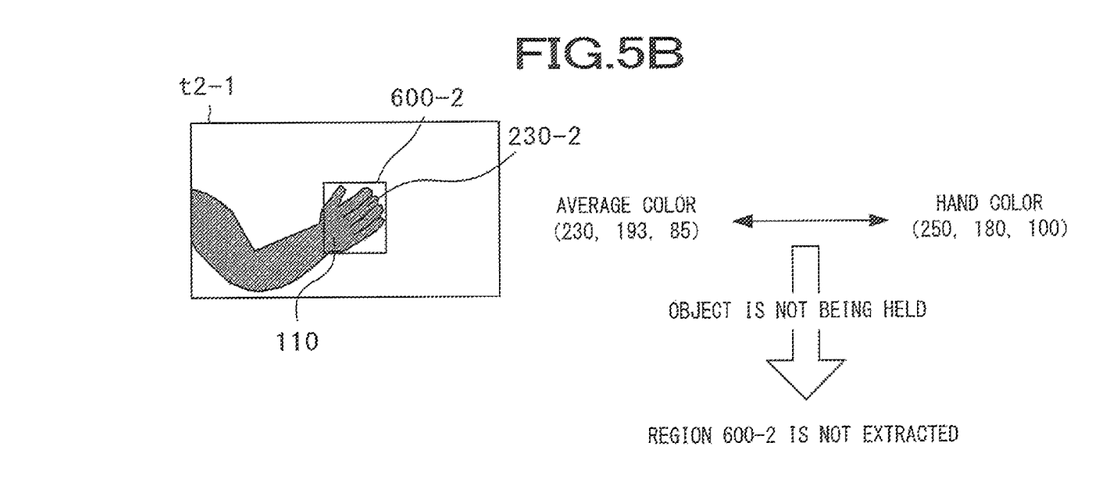

FIGS. 5A and 5B are diagrams illustrating examples of extracting a region on the hand 110's side. The hand 110 holding the object 100 is in the frame t1–1 illustrated in FIG. 5A. Here, the region extraction unit 114 identifies a part 230-1 located in hand 110's side. The region extraction unit 114 calculates brightness values of R, G, and B for the average color of the part 230-1 to be 45, 65, and 100, respectively. Meanwhile, the brightness values of R, G, and B of the predetermined skin color are 250, 180, and 100, respectively. In this case, since the difference in color is larger than the predetermined degree, the region extraction unit 114 extracts a region 600-1 surrounding the part 230-1 located in the hand 110's side. Meanwhile, the hand 110 holding nothing is shown in the frame t2–1 illustrated in FIG. 5A. Here, the region extraction unit 114 identifies apart 230-2 located in the hand 110's side. The region extraction unit 114 calculates brightness values of R, G, and B for the average color of the part 230-2 to be 230, 193, and 85, respectively. In this case, since the difference in color is smaller than the predetermined degree, the region extraction unit 114 does not extract a region 600-2 surrounding the part 230-2 located in the hand 110's side.

When the joint detection unit 113 detects the positions of the finger joint(s) and the fingertip(s) of the human body, the region extraction unit 114 may modify the region 600 to be extracted. Since the position of the object 100 held by the hand 110 can be estimated to some extent from the positions of the finger joint(s) and the fingertip(s), the region 600 is modified with these positions. For example, the region extraction unit 114 may expand the region 600 according to a direction from the finger joint(s) to the fingertip(s). When the object 100 is held by the hand 110, the object 100 usually overlaps with the fingers in the frame t–1. Furthermore, the object 100 tends to protrude in a direction in which the fingertip(s) point. Therefore, the region 600 surrounding the object 100 can be appropriately set by giving a margin to the region 600 in the direction in which the fingertip(s) point.

The direction from the finger joint to the fingertip may be any of a direction from the first joint to the fingertip, a direction from the second joint to the fingertip, and a direction from the third joint to the fingertip. For example, when the first joint is detected, the region extraction unit 114 may preferentially use the direction from the first joint to the fingertip. When the first joint is not detected and the second joint is detected, the region extraction unit 114 may use the direction from the second joint to the fingertip. When only the third joint is detected, the region extraction unit 114 may use the direction from the third joint to the fingertip.

In order to handle a case where the positions of a joint and a fingertip are detected for each of the plurality of fingers, priority ranks may be determined in advance for a finger direction to be used. For example, the priority ranks may be determined in order of the index finger, the middle finger, the ring finger, the little finger, and the thumb. When the index finger is detected, the region extraction unit 114 may determine a direction in which the region 600 is expanded based on the positions of a joint and a fingertip of the index finger. When the index finger is not detected and the middle finger is detected, the region extraction unit 114 may determine the direction in which the region 600 is expanded based on the positions of a joint and a fingertip of the middle finger. The region extraction unit 114 may combine joint-to-fingertip direction vectors for a plurality of detected fingers instead of using the priority ranks. Then, the region extraction unit 114 may expand the region 600 according to a synthesized direction vector.

The region extraction unit 114 may expand the region 600 by a predetermined ratio of area with respect to the original area of the region 600. Alternatively, the region extraction unit 114 may expand the region 600 by a predetermined ratio of length with respect to the length of a vertical or horizontal side of the region 600.

The region extraction unit 114 may expand the region 600 in a direction, among vertical and horizontal directions, closest to the direction from the finger joint(s) to the fingertip(s). Alternatively, the region extraction unit 114 may expand the region 600 in a direction corresponding to each of an X component and a Y component of the finger joint-to-fingertip direction vector. For example, when the fingertip direction is an upper right direction, the region extraction unit 114 may expand the region 600 to the right and upward. In this case, the region extraction unit 114 may determine a ratio between the expansion amount of the region 600 in the horizontal direction and the expansion amount of the region 600 in the vertical direction according to a ratio between the X component and the Y component of the direction vector.

Figure 6:
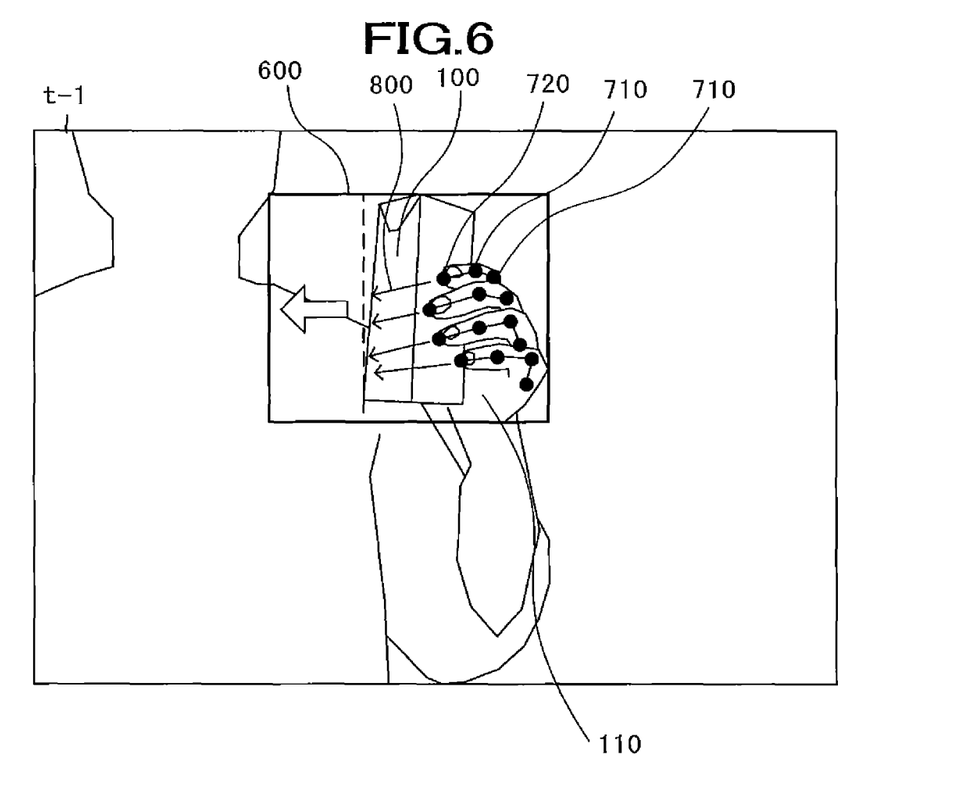
FIG. 6 is a diagram illustrating an example of an expansion of a region 600.

FIG. 6 is a diagram illustrating an example of an expansion of the region 600. The hand 110 holding the object 100 is shown in the frame t–1 illustrated in FIG. 6. Here, the joint detection unit 113 detects the positions of a joint 710 and a fingertip 720 for each of the index finger, the middle finger, the ring finger, and the little finger from the hand 110. For each of the fingers, a direction 800 from the joint 710 to the fingertip 720 is an approximately left direction. Therefore, the region extraction unit 114 may expand the region 600 in the left direction by a predetermined ratio.

Returning to FIG. 3, the training unit 115 trains the model 2 for identifying an object in an image using the image 610 in the region 600 extracted by the region extraction unit 114. The model 2 may be a classifier. The model 2 may output object information 620 indicating an existence probability of an object of each class in the image 610. The model 2 may be a CNN. Examples of the CNN include ResNet, GoogleNet, AlexNet, VGGNet, and the like. Since the image of the object 100 held by the hand 110 is used for training the model 2, it is possible to generate the model 2 that appropriately identifies the object 100 to be identified. Here, in addition to the class of the object to be identified, an "empty" class may be defined. The "empty" class is a class indicating that the hand 110 is holding nothing. The hand 110 holding nothing may be shown in a video imaged by the video taking unit 20. The "empty" class is defined in order to handle such a situation. The training unit 115 may train the model 2 using the image 610 extracted from the video where the hand 110 holding an object of each class to be identified is shown, and also may train the model 2 using the image 610 extracted from the video where the hand 110 holding nothing is shown. Note that when the model 2 is trained by a device other than the image processing device 1, or when the image processing device 1 identifies the object 100 using the trained model, the image processing device 1 does not require the training unit 115.

By inputting the image 610 in the region 600 extracted by the region extraction unit 114 into a predetermined model, the object information output unit 116 outputs the object information 620 indicating the object 100 existing in the extracted region 600. As a result, the object 100 is identified. The model to be used is a model for identifying an object in an image. This model outputs the object information 620 indicating an existence probability of an object of each class in the image 610. This model may be a classifier. This model may be the model 2 trained by the training unit 115. Alternatively, this model may be a model trained by a method different from training by the training unit 115. For example, this model may be a model trained using a video or a still image where the hand 110 holding an object of each class to be identified is z. The image processing device 1 may determine, for example, a class the appearance probability of which is highest and exceeds a predetermined threshold in the object information 620 output by the object information output unit 116 as the class of the object 100. The image processing device 1 may determine that no object to be identified is shown when the appearance probability of the "empty" class is highest. The object information output unit 116 may output the coordinates and size of the region 600 in addition to the object information as an object identification result. Note that when the object 100 is identified by a device other than the image processing device 1, the image processing device 1 does not require the object information output unit 116.

[3. Operation of Image Processing Device]

Figure 7:
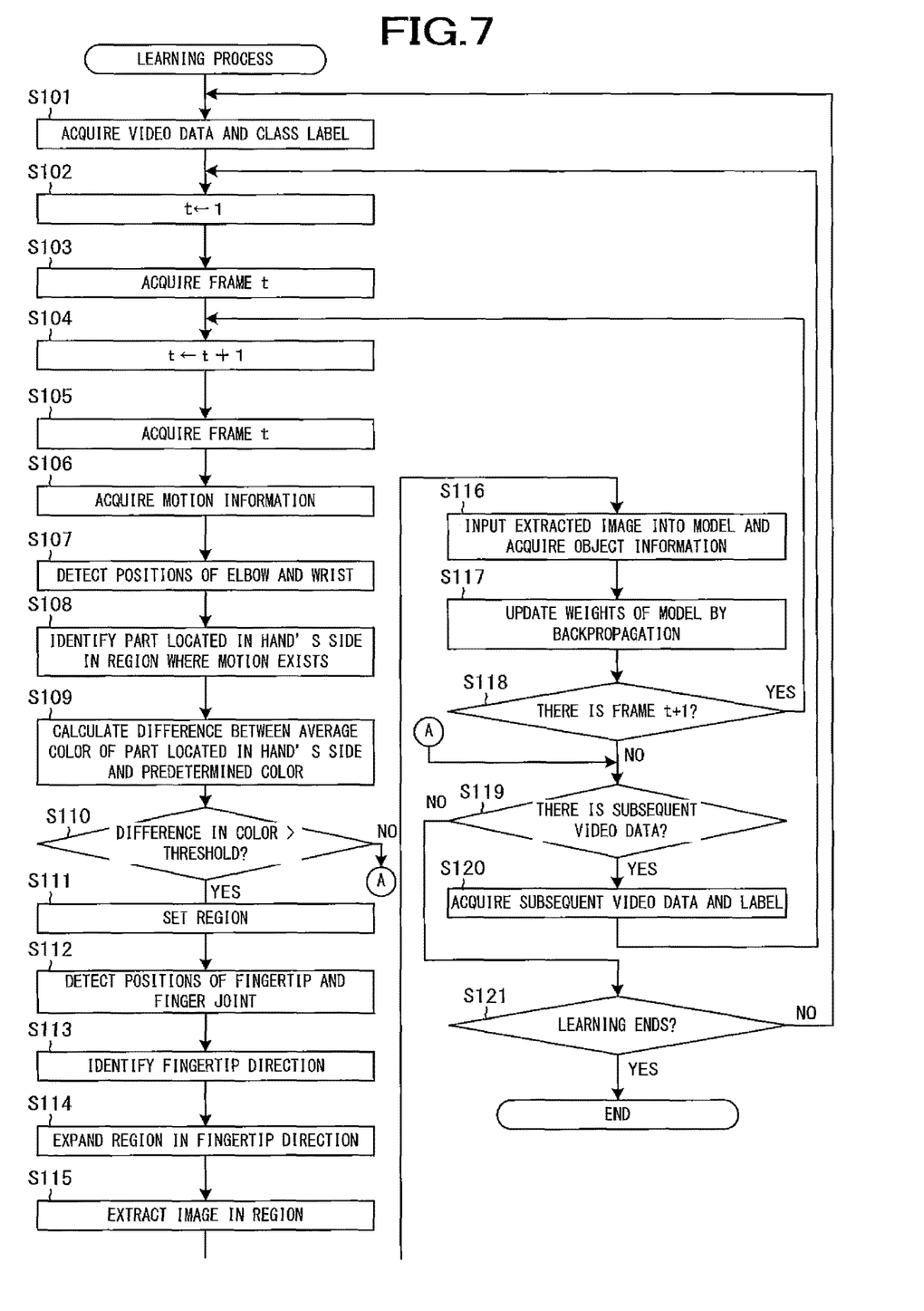
FIG. 7 is a flowchart illustrating an example of a learning process performed by the system control unit 11 and the GPU 18 of the image processing device 1.

Next, operation of the image processing device 1 will be described with reference to FIGS. 7 and 8. FIG. 7 is a flowchart illustrating an example of a learning process performed by the system control unit 11 and the GPU 18 of the image processing device 1. The system control unit 11 and the GPU 18 execute the learning process according to a program code included in a program for generating a model. For example, the learning process may be executed in response to an instruction from an operator using an input unit 16.

As illustrated in FIG. 7, the frame acquisition unit 111 acquires a first set of video data and a class label included in training data stored in the storage unit 14 (step S101). Subsequently, the frame acquisition unit 111 sets the frame number t to 1 (step S102). Subsequently, the frame acquisition unit 111 acquires the frame t from the acquired video data (step S103).

Subsequently, the frame acquisition unit 111 increments the frame number t by 1 (step S104). The frame acquisition unit 111 acquires the frame t from the acquired video data (step S105). Subsequently, the motion information acquisition unit 112 acquires the motion information 200 based on the frame t−1 and the frame t (step S106). For example, by inputting the frame t−1 and the frame t into the model for generating the dense optical flow, the motion information acquisition unit 112 acquires the motion information 200. The frame t−1 at this time is the frame acquired in step S102.

Subsequently, the joint detection unit 113 detects the positions of the elbow 310 and the wrist 320 from the motion region 210 indicated by the motion information 200 in the frame t−1 (step S107). For example, by inputting the frame t−1 into the posture estimation model, the joint detection unit 113 acquires the coordinates of the elbow 310 and the wrist 320. The joint detection unit 113 extracts coordinates indicating the position in the motion region 210 from the acquired coordinates.

Subsequently, the region extraction unit 114 identifies a region 230 on the hand 110's side in the motion region 210 indicated by the motion information 200 based on the acquired coordinates (step S108). For example, the region extraction unit 114 calculates a boundary line 420 passing through the wrist 320. The region extraction unit 114 divides the motion region 210 into two regions with the boundary line 420. The region extraction unit 114 identifies a region where the elbow 310 is not located among these two regions as the part 230 located in the hand 110's side.

Subsequently, the region extraction unit 114 calculates an average color of the identified the part 230 located in hand 110's side. Then, the region extraction unit 114 calculates a difference between the average color of the part 230 and a predetermined skin color (step S109). Subsequently, the region extraction unit 114 determines whether or not the calculated difference in color is larger than the predetermined threshold (step S110). If the difference in color is larger than the threshold (step S110: YES), the region extraction unit 114 extracts the region 600 corresponding to the part 230 located in the hand 110's side (step S111). For example, the region extraction unit 114 identifies the coordinates of each vertex of the part 230. The region extraction unit 114 determines the minimum X and Y coordinates and the maximum X and Y coordinates from the coordinates of all vertices. The region extraction unit 114 determines the coordinates of the region 600 using the determined coordinates. Note that when the class label acquired in step S101 is "empty", the region extraction unit 114 may omit steps S109 and S110 and set the region 600 all the time.

Subsequently, the joint detection unit 113 detects the positions of the finger joint(s) 710 and the fingertip(s) 720 from the motion region 210 indicated by the motion information 200 in the frame t−1 (step S112). Note that in step S107, the joint detection unit 113 may detect the positions of the finger joint(s) 710 and the fingertip(s) 720 as well as the positions of the elbow 310 and the wrist 320.

Subsequently, the region extraction unit 114 identifies the direction from the joint 710 to the fingertip 720 based on the detected positions of the joint(s) 710 and the fingertip(s) 720 (step S113). For example, the region extraction unit 114 specifies a first joint and calculates a vector in a direction from the first joint to the fingertip. When joints and fingertips are detected for a plurality of fingers, the region extraction unit 114 determines a finger direction to be used, for example, according to the priority ranks. The region extraction unit 114 determines whether the region 600 is to be expanded in the right or left direction and the amount of expansion based on the X component of a fingertip direction vector. In addition, the region extraction unit 114 determines whether the region 600 is to be expanded upward or downward and the amount of expansion based on the Y component of the direction vector. Subsequently, the region extraction unit 114 expands the region 600 according to the determined direction and expansion amount, and acquires the coordinates of the expanded region 600 (step S114).

Subsequently, the region extraction unit 114 extracts the image 610 corresponding to the set region 600 from the frame t−1 (step S115). Subsequently, the training unit 115 inputs the extracted image 610 into the model 2 and acquires the object information 620 (step S116). Subsequently, the training unit 115 calculates an error between the acquired object information 620 and the class label acquired in step S101. Then, by backpropagating the calculated error, the training unit 115 updates the weights and biases of the model 2 (step S117). Note that for convenience of explanation, the weights are updated for each frame, but for example, the weight may be updated for each batch including a predetermined number of frames or for each piece of video data.

Subsequently, the training unit 115 determines whether or not the acquired video data includes a frame t+1 (step S118). If the video data includes the frame t+1 (step S118: YES), the process proceeds to step S104.

If the video data does not include the frame t+1 (step S118: NO), or if the difference in color is not larger than the threshold (step S110: NO), the training unit 115 determines whether or not the training data includes a subsequent piece of video data (step S119). If the training data includes the subsequent piece of video data (step S119: YES), the frame acquisition unit 111 acquires a subsequent set of video data and a class label from the training data (step S120), and the process proceeds to step S102. On the other hand, if the training data does not include the subsequent piece of video data (step S119: NO), the training unit 115 determines whether or not to end learning (step S120). For example, when learning is executed a number of times corresponding to the number of epochs set in advance, the training unit 115 may determine to end learning. Alternatively, the training unit 115 may calculate identification errors by identifying objects using test data. If an average value of the calculated identification errors is less than a predetermined value, the training unit 115 may determine to end learning. If learning does not end (step S121: NO), the process proceeds to step S101. If learning ends (step S121: YES), the learning process ends.

Figure 8:
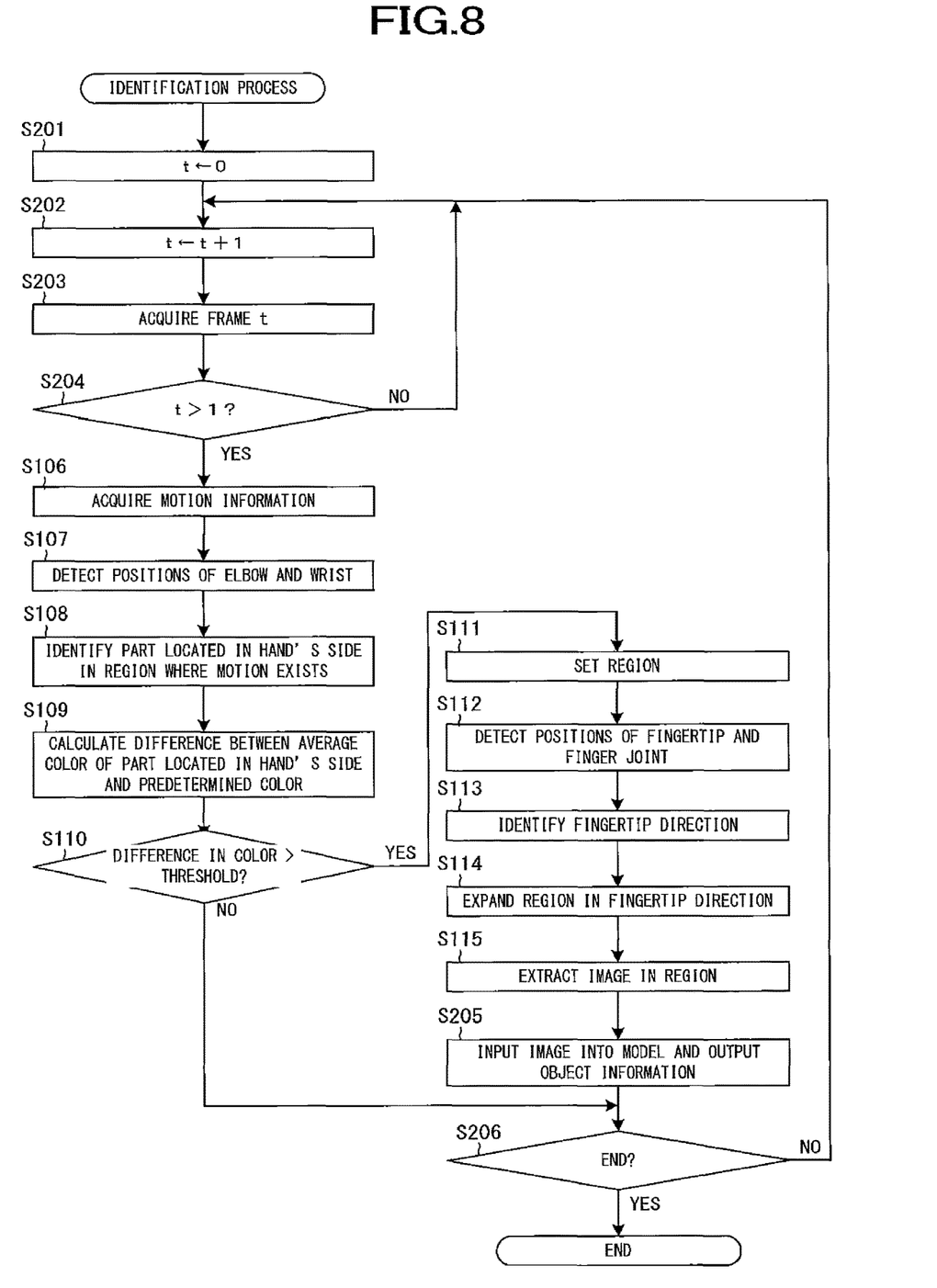
FIG. 8 is a flowchart illustrating an example of an identification process performed by the system control unit 11 and the GPU 18 of the image processing device 1.

FIG. 8 is a flowchart illustrating an example of an identification process performed by the system control unit 11 and the GPU 18 of the image processing device 1. In FIG. 8, the same steps as in FIG. 7 are designated by the same reference numerals. The processing example illustrated in FIG. 8 is a processing example in which an object is identified in real time from a video taken by the video taking unit 20. For example, the identification process is executed using the model 2 for which learning by the learning process illustrated in FIG. 7 has been completed. The system control unit 11 and the GPU 18 execute the identification process according to a program code included in a program for identifying an object. For example, the identification process may be executed when the video taking unit 20 starts taking a video based on an instruction from the system control unit 11.

As illustrated in FIG. 8, the frame acquisition unit 111 sets the frame number t to 0 (step S201). Subsequently, the frame acquisition unit 111 increments the frame number t by 1 (step S202). Subsequently, the frame acquisition unit 111 acquires the latest frame as a frame t from the video taking unit 20 (step S203).

Subsequently, the frame acquisition unit 111 determines whether or not the frame number t is larger than 1 (step S204). If the frame number t is not larger than 1 (step S204: NO), the process proceeds to step S202.

Meanwhile, if the frame number t is larger than 1 (step S204: YES), steps S106 to S110 are executed. In step S110, if the difference in color is larger than the threshold (step S110: YES), steps S111 to S115 are executed. Subsequently, by inputting the image 610 extracted in step S115 into the model 2, the object information output unit 116 outputs the object information 620 (step S205).

After step S205, or if the difference in color is not larger than the threshold (step S110: NO), the object information output unit 116 determines whether or not to end identification of the object (step S206). Conditions for ending identification may be determined in advance according to an application of the image processing device 1. If identification does not end (step S206: NO), the process proceeds to step S202. Meanwhile, if identification ends (step S206: YES), the identification process ends.

As described above, according to the present embodiment, the image processing device 1 acquires the frame t−1 and the frame t which are temporally successive. In addition, the image processing device 1 acquires the motion information 200 indicating the region 210 where the motion exists in the frame t−1 based on the acquired frame t−1 and frame t. In addition, the image processing device 1 detects the positions of the elbow 310 and the wrist 320 of a human body from the region 210 where the motion exists indicated by the acquired motion information 200 based on the acquired frame t−1. In addition, the image processing device 1 extracts the region 600 corresponding to the part 230 located in the human body hand 110's side of the wrist 320 in the region 210 where the motion exists indicated by the acquired motion information 200 based on the detected positions. Since the object 100 held by the hand 110 overlaps with the hand 110 in the image, by extracting the region 600 corresponding to the part located in the hand 110's side, the region 600 where the object 100 is shown can be extracted more accurately.

Here, the image processing device 1 may control extraction of the region 600 corresponding to the part 230 located in the hand 110's side based on a result of comparison between the color of the part 230 located in the hand 110's side and a predetermined skin color. In this case, it is possible to estimate whether or not the hand 110 is holding the object 100 by comparing the color of the part 230 located in the hand 110's side with the predetermined skin color. As a result, extraction of the region 600 is controlled, and therefore it is possible to suppress extraction of a region where the object 100 is not shown.

Here, when a difference between the color of the part 230 located in the hand 110's side and the skin color exceeds a predetermined degree, the image processing device 1 may extract the region 600 corresponding to the part 230 located in the hand 110's side. In this case, it is possible to suppress extraction of a region where the object 100 is not shown.

In addition, the image processing device 1 may further detect the positions of the finger joint 710 and the fingertip 720 of a human body from the region 210 where the motion exists. In addition, the image processing device 1 may modify the extracted region 600 based on the positions of the finger joint 710 and the fingertip 720. In this case, the position of the object 100 held by the hand 110 can be estimated based on the detected positions of the finger joint 710 and the fingertip 720, and therefore the region 600 where the object 100 is shown can be set more appropriately.

Here, the image processing device 1 may expand the extracted region 600 according to a direction from the finger joint 710 to the fingertip 720. In this case, the region 600 can be expanded in the fingertip direction, and therefore the region where the object 100 is shown can be set more appropriately.

In addition, the image processing device 1 may detect the positions of the elbow 310 and the wrist 320 using a predetermined posture estimation model.

In addition, the image processing device 1 may train the model 2 for identifying the object 100 in an image using the image 610 in the extracted region 600. In this case, the model is trained with the image 610 in the region 600 corresponding to the part 230 located in the hand 110's side in the region 210 where the motion exists. Therefore, since the image 610 in the part where the object 100 held by the hand 110 is shown in the frame t−1 is used for training, the model 2 can be trained so as to identify the object 100 more appropriately.

In addition, by inputting the image 610 in the extracted region 600 into a predetermined model, the image processing device 1 may output the object information 620 indicating the object 100 existing in the extracted region 600. In this case, information indicating the object 100 held by the hand 110 is output from the image 610 in the region 600 corresponding to the part 230 located in the hand 110's side in the region 210 where the motion exists. Therefore, since identification of the object 100 not held by the hand is prevented, the object 100 that should be originally identified can be identified.

In addition, the acquired motion information 200 may be a dense optical flow.

REFERENCE SIGNS LIST

1 Image processing device
11 System control unit
12 System bus
13 Input/output interface
14 Storage unit
15 Communication unit
16 Input unit
17 Display unit
18 GPU
19 GPU memory
10 Video taking unit
111 Frame acquisition unit
112 Motion information acquisition unit
113 Joint detection unit
114 Region extraction unit
115 Training unit
116 Object information output unit
2 Model

The invention claimed is:

1. A region extraction device comprising:
at least one memory configured to store computer program code;
at least one processor configured to access the computer program code and operate as instructed by the computer program code, the computer program code including:
frame image acquisition code configured to cause at least one of the at least one processor to acquire a first frame image and a second frame image which are temporally successive;
motion information acquisition code configured to cause at least one of the at least one processor to acquire, based on the acquired first frame image and second frame image, motion information indicating a region where a motion exists in the first frame image;
detection code configured to cause at least one of the at least one processor to detect, based on the acquired first frame image, positions of an elbow and a wrist of a human body from the region where the motion exists indicated by the acquired motion information; and
extraction code configured to cause at least one of the at least one processor to extract, based on the detected positions, a region corresponding to a part, of the region where the motion exists indicated by the acquired motion information, located in a human body hand's side of the wrist.

2. The region extraction device according to claim 1, wherein the extraction code is configured to cause at least one of the at least one processor to control the extraction of the region corresponding to the part located in the hand's side based on a result of comparison between a color of the part located in the hand's side and a predetermined skin color.

3. The region extraction device according to claim 2, wherein the extraction code is configured to cause at least one of the at least one processor to extract the region corresponding to the part located in the hand's side when a difference between the color of the part located in the hand's side and the skin color exceeds a predetermined degree.

4. The region extraction device according to claim 1, wherein
the detection code is configured to cause at least one of the at least one processor to further detect positions of a finger joint and a fingertip of the human body from the region where the motion exists, and
the extraction code is configured to cause at least one of the at least one processor to modify the region to be extracted based on the positions of the finger joint and the fingertip.

5. The region extraction device according to claim 4, wherein the extraction code is configured to cause at least one of the at least one processor to expand the region to be extracted according to a direction from the finger joint to the fingertip.

6. The region extraction device according to claim 1, wherein the detection code is configured to cause at least one of the at least one processor to detect the positions of the elbow and the wrist using a predetermined posture estimation model.

7. The region extraction device according to claim 1, further comprising training code configured to cause at least one of the at least one processor to train, using an image in the extracted region, a model for identifying an object in an image.

8. The region extraction device according to claim 1, further comprising output code configured to cause at least one of the at least one processor to output object information indicating an object existing in the extracted region by inputting an image in the extracted region into a predetermined model.

9. The region extraction device according to claim 1, wherein the acquired motion information is a dense optical flow.

10. A region extraction method performed by a computer, the method comprising:
acquiring a first frame image and a second frame image which are temporally successive;
acquiring, based on the acquired first frame image and second frame image, motion information indicating a region where a motion exists in the first frame image;
detecting, based on the acquired first frame image, positions of an elbow and a wrist of a human body from the region where the motion exists indicated by the acquired motion information; and
extracting, based on the detected positions, a region corresponding to a part, of the region where the motion exists indicated by the acquired motion information, located in a human body hand's side of the wrist.

11. A non-transitory computer readable medium storing thereon a region extraction program causing a computer to:

acquire a first frame image and a second frame image which are temporally successive;

acquire, based on the acquired first frame image and second frame image, motion information indicating a region where a motion exists in the first frame image;

detect, based on the acquired first frame image, positions of an elbow and a wrist of a human body from the region where the motion exists indicated by the acquired motion information; and extract, based on the detected positions, a region corresponding to a part, of the region where the motion exists indicated by the acquired motion information, located in a human body hand's side of the wrist.

* * * * *